Jan. 2, 1968  M. F. BRUNO  3,361,607
METHOD OF FLAME TREATING AND HEAT SEALING A BIAXIALLY
ORIENTED HEAT SHRINKABLE PLASTIC FILM
Filed April 15, 1964
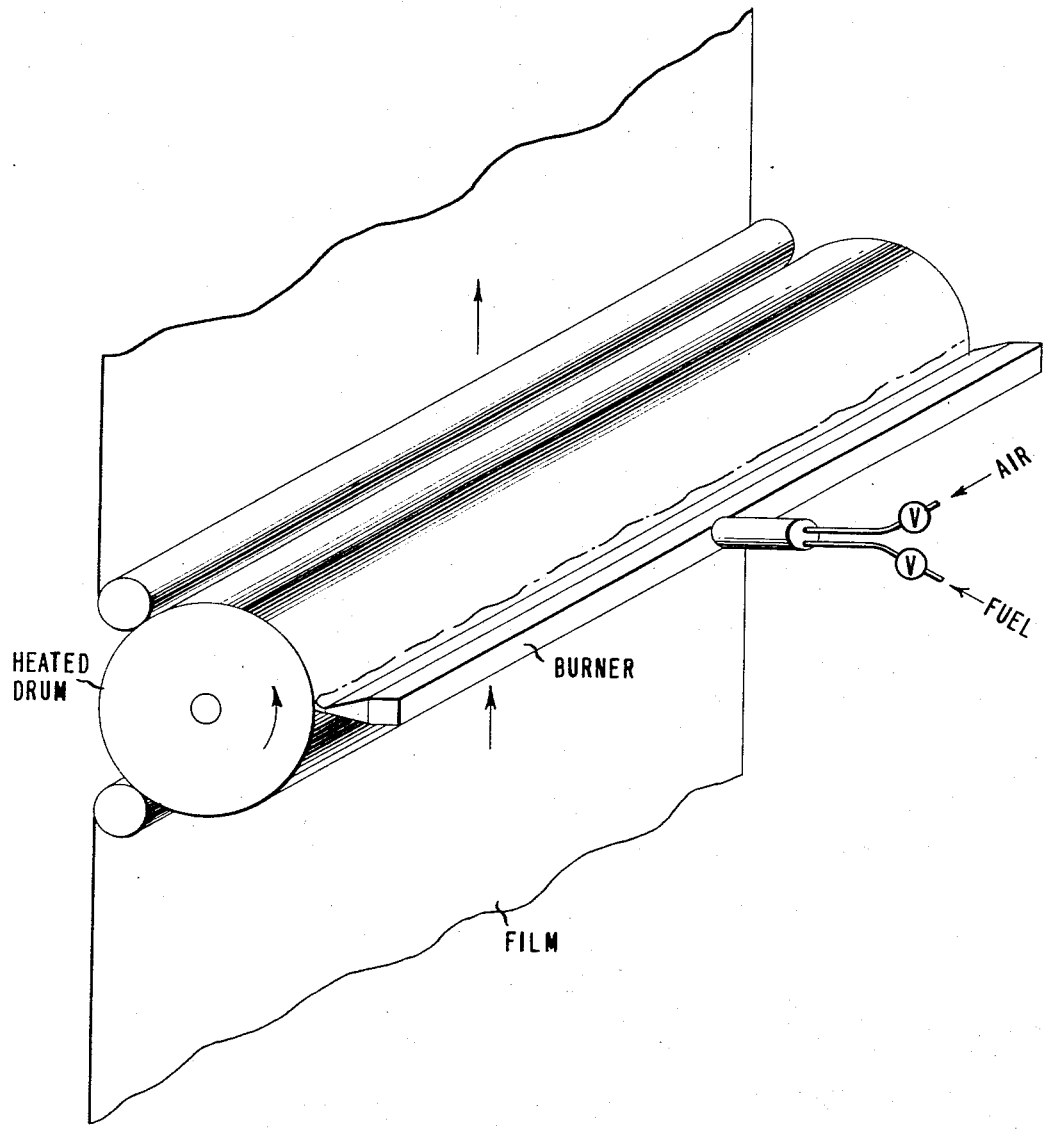
INVENTOR
MICHAEL FRANCIS BRUNO
BY John E. Griffiths
ATTORNEY

United States Patent Office 3,361,607
Patented Jan. 2, 1968

3,361,607
METHOD OF FLAME TREATING AND HEAT SEALING A BIAXIALLY ORIENTED HEAT SHRINKABLE PLASTIC FILM
Michael Francis Bruno, Wilmington, Del., assignor to E. I. du Pont de Nemours and Company, Wilmington, Del., a corporation of Delaware
Filed Apr. 15, 1964, Ser. No. 359,995
8 Claims. (Cl. 156—82)

ABSTRACT OF THE DISCLOSURE

A process for flame treating and heat sealing an uncoated biaxially oriented heat shrinkable film formed from a homogeneous blend of low density and high density ethylene polymers and copolymers comprising passing the film through a flame fed by a fuel of paraffinic and olefinic hydrocarbons, said fuel having a fuel equivalency when mixed with oxygen-enriched air of between 0.95 and 1.05, with said film being supported as it traverses the flame on a surface maintained at a temperature from about room temperature to 40° C., said film being exposed to the flame for a time between .0005 and .1 second; and heat sealing the flame treated film to itself or to another such film similarly treated.

---

This invention relates to heat shrinkable plastic films and to their treatment for improved heat sealability. More particularly, this invention is directed to the flame treatment and heat sealing of biaxially oriented heat shrinkable film formed from a homogeneous blend of low density and high density ethylene polymers and copolymers.

The films just referred to have generally acceptable heat sealing characteristics when the heat sealing requirements are not very demanding or severe such as, for example, when the seal is a simple two-layer lap seal made using an ordinary impulse sealer or a hot wire sealer.

However, when attempts are made to heat seal such films under extremely stringent conditions, such as in making a seal of three or more overlapping layers of film using a high speed packaging heat sealing machine, it is found that highly critical temperature control is required for satisfactory seals. For example, using a commercially available Battle Creek Continuous Flow Overwrapper machine sold by the Battle Creek Machinery Company of Battle Creek, Michigan, satisfactory seals of the low and high density polymer blend films more fully described below can be obtained only in the narrow and critical temperature range of about 275–278° F. This criticality makes high speed packaging operations difficult and heretofore the commercial use of such films in these high speed operations have not been practical.

To improve the heat sealing properties of a plastic film, the common practice is to apply to the film a coating which provides ready heat sealability as well as other features such as improved barrier properties, improved appearance and the like. For many purposes, however, these added property features are not required and therefore the necessity of applying a coating to obtain heat sealability constitutes an undesirable extra cost for manufacture of the film.

In the practice of the present invention, a film coating layer is unnecessary and is not used.

According to the present invention, an uncoated biaxially oriented heat shrinkable film formed from a homogeneous blend of low density and high density ethylene polymers and copolymers is flame treated with a neutral flame of critical characteristics and under critical conditions, and the treated uncoated film is heat sealed to itself or to another such film similarly treated.

It is particularly surprising that the flame treatment according to this invention improves, rather than degrades, heat sealability because, as is widely recognized in this art, the treatment of films, particularly films of polymers or copolymers of olefins such as ethylene, with an electrical discharge or a flame to render the surfaces more readily adherable to other materials such as inks and coatings results generally in a reduction of the heat sealability of the film.

It is also surprising that, whereas the untreated film can be heat sealed on the high speed overwrap machine mentioned above only within a temperature range of barely 3° F., film which is uncoated but which has been flame treated according to the present invention can be heat sealed with excellent results over a temperature range as great as 80° F. or more, i.e. 200–280° F. This considerable increase in heat sealing versatility renders the film commercially valuable for high speed overwrapping operations.

The films useful in the present invention are those formed from a homogeneous blend selected from the group consisting of blend A and blend B, which will now be described more fully:

Blend A

A homogeneous blend of (1) from 70% to 85% by weight, based on the total weight of the blend, of a polymer selected from the group consisting of polyethylene and copolymers of ethylene with olefinically unsaturated monomers copolymerizable therewith, said polymer having a density within the range of 0.91 to 0.93 gram/cc. at 25° C., and (2) from 30% to 15% by weight, based on the total weight of the blend, of a linear polymer selected from the group consisting of linear polyethylene and linear copolymers of ethylene with olefinically unsaturated monomers copolymerizable therewith to form linear copolymers, said linear polymer having a density within the range of 0.94 to 0.98 gram/cc. at 25° C.

Blend B

A homogeneous blend of (1) from 20% to 80% by weight, based on the total weight of the blend, of polyethylene having a density within the range of 0.910 to 0.925 gram/cc. at 25° C., and (2) from 80% to 20% by weight, based on the total weight of the blend, of a linear copolymer of ethylene and 1-butene, said linear copolymer having a density within the range of 0.920 to 0.935 gram/cc. at 25° C., and made of 90% to 97% by weight of ethylene and 10% to 3% 1-butene.

The preferred blend of polymers of blend A for purposes of this invention contains from 75% to 80% by weight, based on the total weight of the blend, of the polymer having a density of 0.91 to 0.93. This low density resin may also comprise, in whole or in part, copolymers of ethylene such as those produced by free radical catalysis with monomers of the type of vinyl acetate, methyl methacrylate, ethyl acrylate, styrene, vinyl methyl ether, diisobutylene, methacrylic acid, and acrylonitrile, the important criterion being that the density of the copolymer be in the range of 0.91 to 0.93, and preferably within the range of 0.91 to 0.925 gram/cc. at 25° C.

Similarly, with respect to blend A, the high density polymer resin having a density of 0.94 to 0.98 may comprise, in whole or in part, linear copolymers of ethylene, especially those producible by coordination-type catalysis. Suitable monomers copolymerizable with ethylene to produce linear copolymers include the alpha-olefins having 3 to 20 carbon atoms such as propylene, n-butene-1, n-pentene-1, n-hexene-1, n-heptene-1, n-octene-1, n-decene-1, 4-methylpentene-1, n-tetradecene-1, n-octadecene-1, as well as mixtures of certain of these monomers such as heptene-1/octene-1/nonene-1 mixtures, the important criterion being that the density of the linear polymers be in the range of 0.94 to 0.98, and preferably in the range of 0.94 to 0.975.

With respect to blend A, a preferred embodiment of this invention utilizes a blend of about 75% to 80% by weight of low density (branched) polyethylene and about 25% to 20% of high density (linear) polyethylene having a melt index below 2.0. Films formed of such a blend are characterized by a shrinkage of at least 15% along each axis in the plane of the film when subjected to a temperature of 100° C., and a shrinkage tension of at least 150 grams/inch/mil at 100° C. It is also preferred that a conventional slip promoting additive for polyethylene film be incorporated in the blend.

With reference to blend B, a preferred embodiment of this invention utilizes a blend of about 50% to 75% of a branched polyethylene resin having a density of about 0.915 gram/cc. at 25° C. and about 25% to 50% of a linear copolymer of ethylene and 1-butene having a density in the range of 0.920 to 0.930 gram/cc. at 25° C., the copolymer having been made with a coordination catalyst system. Films formed of such a blend are characterized by a shrinkage of at least 20% along each axis in the plane of the film when subjected to a temperature of 100° C., a shrinkage tension of at least 200 grams/inch/mil at 100° C., a haze value below 3.0, a gloss value greater than 100 and a transparency value of at least 65.

The pow and high density polymer resins in the relative proportions stated above may be blended by any conventional blending technique effective to produce a uniform homogeneous blend. The resulting blend may be extruded, preferably from a melt of the blend, in flat or tubular film, or integral net-like forms by any of the extrusion processes heretofore employed in the production of thermoplastic polymeric film and netting.

Following extrusion, the resulting film or like structure is thereafter biaxially oriented by suitably stretching it in each of two mutually perpendicular directions in the plane of the film to the extent of at least 3× (i.e., at least three times the original dimension of the film in each direction), and preferably within the range of 3× to 7×, and preferably at least 5× in one direction of the film. The practical upper limit on the amount of stretch is actually the breaking point of the film but ordinarily stretch ratios as high as 10× will be sufficient.

With the heat shrinkable films just described, it will be desirable in some cases that the amount of shrinkage be essentially the same in both directions in which case the stretching in both directions may be done simultaneously. An alternative is to post-stretch the film along the axis having the lower shrinkage to the extent that balanced shrinkage in both directions is realized. There are other situations wherein it is desirable that the extent of shrinkage in one direction may be more or less than in the other direction. To realize this, a sequential stretching is best employed. In general, the amount of stretch in a given direction for the ratio of stretch in the two directions or the order of stretching in one direction or the other is dictated by the amount of shrinkage desired along the given axis.

For best results, stretching is carried out at a temperature of about 100° C. to about 110° C. However, the films can be stretched at temperatures as low as 95° C. and up to about 115° C. The amount of stretch required and the temperature at which stretching is carried out are inter-related. That is, as temperature is increased, a greater amount of stretch is required to effect a given amount of desired orientation in the sheet. The converse is true as temperature is decreased.

Now, in accordance with the present invention, the uncoated biaxially oriented, heat shrinkable polyolefin film formed from blend A or blend B as described above is passed through a flame emanating from the discharge opening of a burner supplied with a gaseous mixture of a hydrocarbon fuel and oxygen-enriched air, said fuel being selected from the group of hydrocarbons consisting of paraffinic and olefinic hydrocarbons, the fuel equivalence ratio of said gaseous mixture supplied to the burner being between 0.95 and 1.05, the oxygen ratio of said gaseous mixture being between 0.21 and 0.30, the path of the film as it traverses the flame from the burner being located at a distance from the burner less than the length of the unimpeded envelope of the flame but not less than the distance below which the velocity of the burning gases escaping from the immediate vicinity of said discharge opening exceeds the burning velocity of the flame, the surface on which said film is supported as said film traverses the flame being maintained at a temperature from about room temperature up to not above 40° C., the exposure of the film to the action of the flame being for a time between 0.0005 sec. and 0.1 sec.

Also in accordance with the present invention, the uncoated flame treated film is then heat sealed. Conventional techniques of heat sealing may be employed.

The expression "fuel equivalence ratio," employed herein in defining the gaseous mixture supplied to the burner, is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right for a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

By "the length of the unimpeded envelope" is meant the distance from the discharge opening of the burner to the tip of the envelope of the flame when the burner is so positioned that the flame burns freely and the envelope is not distorted by impingement on any surface or by the proximate passage of any surface.

An essential feature of the process of this invention is that the gaseous mixture which provides the flame from the burner must be such that the flame is essentially neutral, i.e., is neither oxidizing or reducing in its action. To insure such a flame it is required that the fuel equivalence ratio of the gaseous mixture should be maintained as close as possible to 1.00. However, satisfactory adhesion of the coating subsequently applied to the flame-treated film is obtained with a fuel equivalence ratio as low as 0.95 and as high as 1.05. It is further required that the oxygen ratio of the gaseous mixture be maintained above 0.21 and preferably within the range of from 0.25 to 0.30. Little benefit is to be gained from operating at higher oxygen ratios, and at ratios much below 0.25, especially below 0.21, the adhesion values of the coatings rapidly diminish. While the invention is illustrated with propane as the fuel gas for the flame treatment, the process is, of course, operable with other hydrocarbon fuels such as butane, ethane, ethylene, acetylene and the like or with a mixture of such gases.

In order to achieve satisfactory flame treatment the surface of the film undergoing treatment should be spaced from the discharge opening of the burner a distance less than the length of the unimpeded envelope of the flame but such distance should not be less than the distance below which the velocity of the burning gases escaping from the immediate vicinity of said discharge opening exceeds the burning velocity of the flame. In practice, in the treatment of film composed of a blend of high and low density polyethylene, a distance of between 3.0 mm. and 4.0 mm. from the film surface to the discharge opening of the burner has given optimum results. The optimum distance will, of course, vary with variations in the velocity of the burning gases issuing from the burner opening, and hence with the height of the film as well as with film speed.

The film supporting surface in contact with the surface of the film directly opposite the surface of film undergoing flame treatment should be maintained at a temperature not higher than 40° C., and preferably should be maintained as illustrated in the accompanying drawing wherein the film is shown passing over a drum provided with conventional means (not shown) for maintaining the surface of the drum at a temperature of not above 40° C. A burner, to which is fed fuel and oxygen enriched air as above specified, extends parallel to the longitudinal axis of the drum and provides from a slotted discharge opening a continuous ribbon flame substantially coextensive with the width of the film.

Density as used herein is determined by preparing the sample as described in ASTM-1248-60T and measuring its density following the method of ASTM-D-1505-57T.

Melt index as used herein is determined as described in ASTM-D-1238-52T.

Crystalline melting point as used herein is measured by viewing the resin through a polarizing microscope as the resin is heated and determining the temperature at which birefringence disappears. The temperature at which birefringence completely disappears is taken as the crystalline melting point.

Shrinkage as used herein is determined by measuring a given area on a sheet of film, dipping the film in boiling water for 30 seconds, noting the change in dimension and calculating percent shrinkage, based on the original dimension.

Shrinkage tension as used herein is determined by fastening a rectangular piece of film to a rectangular frame with all four edges of the film being secured. One of the frame segments holding opposite edges of the film along one axis is secured to a fixed position and the opposite is attached to a Dynisco Strain Gage (No. 5922) which in turn is connected to a Sanborn Recorder. A current of air at a controlled measured temperature is impinged on the film surface for approximately 30 seconds. The tension measured as the force in grams exerted by the film is recorded with the air impinging on the film. The measurement is expressed as grams/inch/mil.

Haze value as used herein is determined as described in ASTM-D-1003-59T.

Gloss value as used herein is determined as described in ASTM-D-523-53T.

Transparency value as used herein is determined as described in ASTM-D-1746-60T.

The following examples will serve to more fully illustrate the principles and practice of this invention:

*Example 1*

A blend of 75% by weight of "Alathon"[1]-1413 low-density (0.915 gram/cc. at 25° C.) polyethylene resin and 25% by weight of "Alathon"-7020 high-density (0.958 gram/cc. at 25° C.) polyethylene resin in flake form was blended on a ball mill together with 1000 parts per million (by weight) of an additive consisting of Armid[2]-O, "Armid"[2]-HT, 2,6-ditertiary-butyl-4-methylphenol and silica in the weight ratio of 1,1,2,2, respectively.

The resulting blend having a density of 0.925 gram/cc. at 25° C., a crystalline melting point of 125° C. and a melt index of 0.39 was melt extruded through a 2-inch annular extrusion die at a melt temperature of 215° C., and at the rate of 2.5 ft./min., to form a tubular film 2 inches in diameter. The extruded tubing was then passed over an internal quenching mandrel maintained at 25° C., after which it was passed through an initial external heating zone wherein the temperature of the tubing was raised to 100° C.; thereafter it was passed into a final heating zone wherein an internal heater raised the temperature of the tube to 115° C., whereupon the tubing was expanded circumferentially to a diameter of 10 inches by means of internal gas pressure, and stretched longitudinally by an increase in draw-off speed to 12.5 ft./min. The stretched tubing was thereafter cooled and slit to form a flat film stretched 4.6× in the axial or longitudinal (MD) direction of the film and 5× in the transverse (TD) direction.

The biaxially oriented heat shrinkable polyethylene film made as just described was given a flame treatment in the apparatus shown schematically in FIG. 1, attached. The burner lip opening was 100 mils in width, the film distance from the burner was 0.3 millimeters, the drum temperature was maintained at 40° C., and propane was employed as the fuel. The rate of flame treating was 350 ft./min., fuel equivalence ratio was 1.0 oxygen ratio was 0.278, length of unimpeded flame envelope was 4 mm., exposure time of the film to the flame was .0014 second.

A roll of the treated film was then used for overwrapping of articles on a Battle Creek Continuous Flow Overwrapper sold by the Battle Creek Machinery Co., Battle Creek, Mich. Excellent sealing of the overwrap was obtained over a temperature range of 200° F. to 280° F., or a range of 80° F. In a controlled experiment wherein another sample of the same heat shrinkable film had not been given any flame treatments, very poor sealing results were obtained on the same machine with satisfactory seals resulting in only the very narrow range of 3° F., from 275° F. to 278° F.

In still another experiment, the same type of heat shrinkable film was subjected to a flame treatment essentially as described above but in which the fuel equivalence ratio was held at 0.85, that is, under an oxidizing condition inasmuch as there was a deficiency of fuel in the flame. The resulting film showed very poor sealing performance on the Battle Creek Continuous Flow Overwrapper Machine with hardly any acceptable sealing of the packages. A similar result was obtained when the heat shrinkable film was flame treated with a high fuel equivalence ratio of 1.15, that is, under conditions of a deficiency of oxidizing agent and an excess of fuel in the flame, i.e. reducing conditions.

In still another experiment, the heat shrinkable film of the same type was subjected to an electrical discharge treatment following the general procedure described in Traver U.S. Patent No. 3,018,189 issued Jan. 23, 1964. The resulting treated film when run on the Battle Creek Continuous Flow Overwrapper Machine gave satisfactory overwrap seals in a temperature range from only 210° F. to 215° F., a temperature range which is difficult to maintain in continuous operation in packaging machines.

Example 1 of this invention can be repeated using other biaxially oriented heat shrinkable polyethylene film within the scope of blend A described above and produced according to a variety of the conditions described above. A large number of such films useful according to the present invention are described, for example, in Golicke U.S. patent application Ser. No. 119,309, filed June 26, 1961, now abandoned. By way of exemplification, results similar to those of Example 1 can be obtained using polyethylene films of the following blends:

| Percent by weight | Polyethylene density | Percent by weight | Polyethylene density |
| --- | --- | --- | --- |
| 70 | 0.915 | 30 | 0.958 |
| 80 | 0.915 | 20 | 0.958 |
| 85 | 0.915 | 15 | 0.958 |
| 75 | 0.919 | 25 | 0.950 |
| 75 | 0.914 | 25 | 0.945 |

*Example 2*

Following the procedure of Example 1, an oriented heat shrinkable polyethylene film from 75% by weight of "Alathon"-1413 low density (0.915 gram/cc. at 25° C.) polyethylene resin and 25% by weight of a copolymere of 96% by weight ethylene and 4% by weight 1-bu- ---
[1] "Alathon" Polyethylene Resin—E. I. du Pont de Nemours & Co.
[2] Long Chain Amides—Armour & Co.

tene made by coordination catalysis and having a density of 0.925 gram/cc. at 25° C. was subjected to flame treatment at a fuel ratio equivalence of 1.00 and an oxygen ratio of 0.265, film distance from burner lip of 3.7 mm., length of unimpeded flame envelope of 4 mm., and film exposure time of .002 second.

The resulting film gave excellent overwrap seals when used to overwrap articles on the Battle Creek Continuous Flow Overwrapper Machine. A sealing range of approximately 80° F. was realized. By contrast, with no flame treatment, a heat sealing range for this particular heat shrinkable film was about 10–15° F. The heat sealing range was essentially unchanged from this when the flame treatment was carried out under reducing conditions (fuel equivalence ratio of 1.15) or under oxidizing conditions (fuel equivalence ratio of 0.85).

Example 2 of this invention can be repeated using other biaxially oriented heat shrinkable polyethylene films within the scope of blend B described above and produced according to a variety of the conditions described above. A large number of such films useful according to the present invention are described, for example, in copending application Snyder U.S. Ser. No. 360,116, filed April 15, 1964, and assigned to the same assignee as that of the present invention.

It is to be understood that the foregoing detailed description is given merely by way of illustration and that many variations may be made therein without departing from the spirit or scope of this invention.

The invention claimed is:

1. The process of treating and heat sealing a heat shrinkable biaxially oriented film made of a homogeneous blend selected from the group consisting of (A) a blend of (1) from 70% to 85% by weight, based on the total weight of the blend, of a polymer selected from the group consisting of polyethylene and copolymers of ethylene with olefinically unsaturated monomers copolymerizable therewith, said polymer having a density within the range of 0.91 to 0.93 gram/cc. at 25° C., and (2) from 30% to 15% by weight, based on the total weight of the blend of a linear polymer selected from the group consisting of linear polyethylene and linear copolymers of ethylene with olefinically unsaturated monomers copolymerizable therewith to form linear copolymers, said linear copolymer having a density within the range of 0.94 to 0.98 gram/cc. at 25° C. and (B) a blend of (1) from 20% to 80% by weight, based on the total weight of the blend, of polyethylene having a density within the range of 0.910 to 0.925 gram/cc. at 25° C., and (2) from 80% to 20% by weight, based on the total weight of the blend, of a linear copolymer of 90–97% by weight of ethylene and 10–3% by weight of 1-butene, said linear copolymer having a density within the range of 0.920 to 0.935 gram/cc. at 25° C., said process comprising: treating said film by passing said film through a flame emanating from the discharge opening of a burner supplied with a gaseous mixture of a hydrocarbon fuel and oxygen-enriched air, said fuel being selected from the group of hydrocarbons consisting of paraffinic and olefinic hydrocarbons, the fuel equivalence ratio of said gaseous mixture supplied to the burner being between 0.95 and 1.05, the oxygen ratio of said gaseous mixture being between 0.21 and 0.30, the path of the film as it traverses the flame from the burner being located at a distance from the burner less than the length of the unimpeded envelope of the flame but not less than the distance below which the velocity of the burning gases escaping from the immediate vicinity of said discharge opening exceeds the burning velocity of the flame, the surface on which said film is supported as said film traverses the flame being maintained at a temperature from about room temperature up to not above 40° C., the exposure of the film to the action of the flame being for a time between 0.0005 sec. and 0.1 sec.; and heat sealing the resulting uncoated flame-treated film to itself or to another such film similarly treated.

2. The process as set forth in claim 1 wherein said film is made of a blend of (1) from 70% to 85% by weight, based on the total weight of the blend, of a polymer selected from the group consisting of polyethylene and copolymers of ethylene with olefinically unsaturated monomers copolymerizable therewith, said polymer having a density within the range of 0.91 to 0.93 gram/cc. at 25° C., and (2) from 30% to 15% by weight, based on the total weight of the blend, of a linear polymer selected from the group consisting of linear polyethylene and linear copolymers of ethylene with olefinically unsaturated monomers copolymerizable therewith to form linear copolymers, said linear polymer having a density within the range of 0.94 to 0.98 gram/cc. at 25° C.

3. The process as set forth in claim 2 wherein the polymer of density of 0.91 to 0.93 gram/cc. at 25° C. constitutes 75% to 80% of the total weight of the blend and the linear polymer of density of 0.94 to 0.98 gram/cc. at 25° C. constitutes 25% to 20% of the total weight of the blend.

4. The process as set forth in claim 2 wherein the lower density polymer has a density within the range of 0.91 to 0.925 gram/cc. at 25° C. and the linear polymer has a density within the range of 0.94 to 0.975 gram/cc. at 25° C.

5. The process as set forth in claim 2 wherein the lower density polymer is branched chain polyethylene and the linear polymer is linear polyethylene.

6. The process as set forth in claim 1 wherein said film is made of a blend of (1) from 20% to 80% by weight, based on the total weight of the blend, of polyethylene having a density within the range of 0.910 to 0.925 gram/cc. at 25° C., and (2) from 80% to 20% by weight, based on the total weight of the blend, of a linear copolymer of 90–97% by weight of ethylene and 10–3% by weight of 1-butene, said linear copolymer having a density within the range of 0.920 to 0.935 gram/cc. at 25° C.

7. The process as set forth in claim 6 wherein said polyethylene constitutes about 50% to 75% of the total weight of the blend and said linear copolymer constitutes about 25% to 50% of the total weight of the blend.

8. The process as set forth in claim 6 wherein said polyethylene has a density of about 0.915 gram/cc. at 25° C. and said linear copolymer has a density of about 0.930 gram/cc. at 25° C.

References Cited

UNITED STATES PATENTS

| 2,983,704 | 5/1961 | Roedel | 206—45.5 |
| 3,255,034 | 6/1966 | Covington et al. | 264—80 X |
| 3,247,490 | 4/1966 | Werkman et al. | |
| 2,795,820 | 6/1957 | Graw et al. | 264—80 |

EARL M. BERGERT, *Primary Examiner.*

PHILIP DIER, *Examiner.*